(12) United States Patent
Yoo et al.

(10) Patent No.: US 12,531,840 B2
(45) Date of Patent: Jan. 20, 2026

(54) ELECTRONIC APPARATUS FOR VEHICLE AND METHOD FOR STORING VEHICLE INFORMATION IN ELECTRONIC APPARATUS

(71) Applicant: Samsung Electronics Co., Ltd., Suwon-si (KR)

(72) Inventors: Hyunjoon Yoo, Suwon-si (KR); Min-Ho Kim, Suwon-si (KR); Dongouk Moon, Suwon-si (KR); Kyoungeun Lee, Suwon-si (KR); Seunghan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 176 days.

(21) Appl. No.: 18/048,617

(22) Filed: Oct. 21, 2022

(65) Prior Publication Data

US 2023/0224282 A1    Jul. 13, 2023

(30) Foreign Application Priority Data

Jan. 7, 2022  (KR) .................. 10-2022-0003010
Apr. 19, 2022  (KR) .................. 10-2022-0048458

(51) Int. Cl.
*H04L 9/30*     (2006.01)
*H04L 9/32*     (2006.01)
*H04L 9/40*     (2022.01)

(52) U.S. Cl.
CPC ............ *H04L 63/0428* (2013.01); *H04L 9/30* (2013.01); *H04L 9/3247* (2013.01)

(58) Field of Classification Search
CPC ... H04L 63/0428; H04L 63/0442; H04L 9/30; H04L 9/3247; H04L 9/0825; H04L 9/0894; H04L 2209/84; H04W 4/40; H04W 4/46; H04W 12/03; H04W 12/10
See application file for complete search history.

(56) References Cited

U.S. PATENT DOCUMENTS

| | | | |
|---|---|---|---|
| 9,769,658 B2 | 9/2017 | Dolev et al. | |
| 9,898,667 B2 | 2/2018 | Kang et al. | |
| 10,390,221 B2* | 8/2019 | Lawlis | .............. H04L 9/14 |
| 10,713,948 B1 | 7/2020 | Kim et al. | |
| 12,022,012 B1* | 6/2024 | Shi | ............ H04L 9/3247 |
| 2004/0001593 A1* | 1/2004 | Reinold | ............ B60R 25/04 |
| | | | 380/277 |
| 2004/0003233 A1* | 1/2004 | Reinold | ............ H04L 63/0823 |
| | | | 713/155 |
| 2015/0052352 A1* | 2/2015 | Dolev | ............ H04L 9/3278 |
| | | | 713/156 |

(Continued)

FOREIGN PATENT DOCUMENTS

| | | | |
|---|---|---|---|
| KR | 20100107800 A | 10/2010 | |
| KR | 20120103352 A | 9/2012 | |

(Continued)

*Primary Examiner* — Lynn D Feild
*Assistant Examiner* — Abdullah Almamun
(74) *Attorney, Agent, or Firm* — Wolf, Greenfield & Sacks, P.C.

(57) ABSTRACT

An electronic apparatus mounted on a first vehicle collects information of a second vehicle connected to the first vehicle, encrypts the information of the second vehicle based on a public key of the second vehicle to generate encrypted information, and stores encrypted information in a storage device.

20 Claims, 8 Drawing Sheets

(56) References Cited

U.S. PATENT DOCUMENTS

| | | | |
|---|---|---|---|
| 2016/0112201 A1* | 4/2016 | Misawa | H04L 9/30 |
| | | | 713/168 |
| 2016/0323741 A1* | 11/2016 | Lee | H04W 12/06 |
| 2018/0026949 A1* | 1/2018 | Kimn | H04W 12/069 |
| | | | 713/156 |
| 2019/0158297 A1* | 5/2019 | Yabuuchi | H04W 12/04 |
| 2019/0193659 A1 | 6/2019 | Miyazawa et al. | |
| 2019/0281027 A1* | 9/2019 | Cao | H04L 63/0442 |
| 2020/0101917 A1* | 4/2020 | Kumar | G08G 1/162 |
| 2020/0142472 A1 | 5/2020 | Golov | |
| 2020/0250901 A1 | 8/2020 | Golov | |
| 2020/0313900 A1* | 10/2020 | Mondello | H04W 4/90 |
| 2021/0266732 A1* | 8/2021 | Zhou | H04L 9/3073 |
| 2021/0304592 A1* | 9/2021 | Lepp | H04W 4/40 |
| 2022/0038906 A1* | 2/2022 | Dreasher | H04W 12/122 |
| 2022/0086127 A1* | 3/2022 | Hinh | H04W 12/041 |
| 2022/0135084 A1* | 5/2022 | Choi | G01C 21/3407 |
| | | | 701/2 |
| 2022/0303765 A1* | 9/2022 | Zhou | H04L 9/3247 |
| 2024/0007271 A1* | 1/2024 | Inaba | H04L 9/0861 |

FOREIGN PATENT DOCUMENTS

| | | | | |
|---|---|---|---|---|
| KR | 101294285 B1 | 8/2013 | | |
| KR | 101476886 B1 | 12/2014 | | |
| KR | 101521412 B1 | 5/2015 | | |
| KR | 101836990 B1 | 3/2018 | | |
| WO | WO-2019170530 A1 * | 9/2019 | | G07C 5/008 |

* cited by examiner

ELECTRONIC APPARATUS FOR VEHICLE AND METHOD FOR STORING VEHICLE INFORMATION IN ELECTRONIC APPARATUS

CROSS-REFERENCE TO RELATED APPLICATION

This application claims priority to and the benefit of Korean Patent Application No. 10-2022-0003010 filed in the Korean Intellectual Property Office on Jan. 7, 2022, and priority to and the benefit of Korean Patent Application No. 10-2022-0048458 filed in the Korean Intellectual Property Office on Apr. 19, 2022, the entire contents of which are incorporated herein by reference.

FIELD

The disclosure relates to an electronic apparatus for a vehicle and a method of storing vehicle information in the electronic apparatus.

BACKGROUND

Accidents while driving a vehicle may be difficult to avoid. Various factors may affect a vehicle operation alone or in combination, resulting in the accident of the vehicle. A modern vehicle may store accident information in a storage device mounted on the vehicle when the accident occurs. When the vehicle stores the accident information, the information stored in the vehicle may be lost due to a physical problem caused by the accident.

SUMMARY

Some embodiments may provide an electronic apparatus for a vehicle and a method of storing vehicle information in the electronic apparatus, for safely securing accident information of a vehicle.

According to some embodiments, an electronic apparatus configured to be mounted on a first vehicle may be provided. The electronic apparatus may include a storage device including a non-volatile memory, a memory configured to store one or more computer-readable instructions, and at least one processor. The processor, by executing the one or more computer-readable instructions, may collect information of a second vehicle connected to the first vehicle, encrypt the information of the second vehicle based on a public key of the second vehicle to generate encrypted information, and store the encrypted information in the storage device.

In some embodiments, when the first vehicle is connected with the second vehicle, the processor may share the public key of the second vehicle.

In some embodiments, the processor may transmit the encrypted information to a server.

In some embodiments, the processor may delete the encrypted information from the storage device after transmitting the encrypted information to the server.

In some embodiments, the processor may sign the encrypted information based on a private key of the first vehicle to generate a signature, and transmit the encrypted information appended with the signature to the server.

In some embodiments, the non-volatile memory may include a non-rewritable memory.

In some embodiments, the processor may store the encrypted information in an area where deletion is prohibited within the storage device.

In some embodiments, the electronic apparatus may further include a communication interface configured to communicate with the second vehicle. The processor may receive the information of the second vehicle from the second vehicle through the communication interface.

In some embodiments, when an accident probability of the second vehicle exceeds a threshold, the processor may receive the information of the second vehicle from the second vehicle through the communication interface.

In some embodiments, the information of the second vehicle may be signed based on a private key of the second vehicle, and the processor may verify a signature based on the public key of the second vehicle.

In some embodiments, the electronic apparatus may further include a sensor configured to sense the second vehicle. The processor may collect the information of the second vehicles from the sensor.

In some embodiments, when an accident probability of the second vehicle exceeds a threshold, the processor may collect the information of the second vehicle from the sensor.

In some embodiments, the information of the second vehicle may include identification information of the second vehicle and information related to an accident of the second vehicle.

According to some embodiments, an electronic apparatus configured to be mounted on a first vehicle may be provided. The electronic apparatus may include a storage device including a non-volatile memory, a memory configured to store one or more computer-readable instructions, and a processor. The processor, by executing the one or more computer-readable instructions, may transmit information of the first vehicle to an external device, and acquire the information of the first vehicle based on a private key of the first vehicle from a server to which the information of the first vehicle that is encrypted based on a public key of the first vehicle by a second vehicle is uploaded.

According to some embodiments, a method is performed by an electronic apparatus of a first vehicle by executing one or more computer-readable instructions by at least one processor of the electronic apparatus. The method may include collecting information of a second vehicle connected to the first vehicle, encrypting the information of the second vehicle based on a public key of the second vehicle to generate encrypted information, and storing the encrypted information in a storage device of the electronic apparatus.

DETAILED DESCRIPTION

Figure 1:
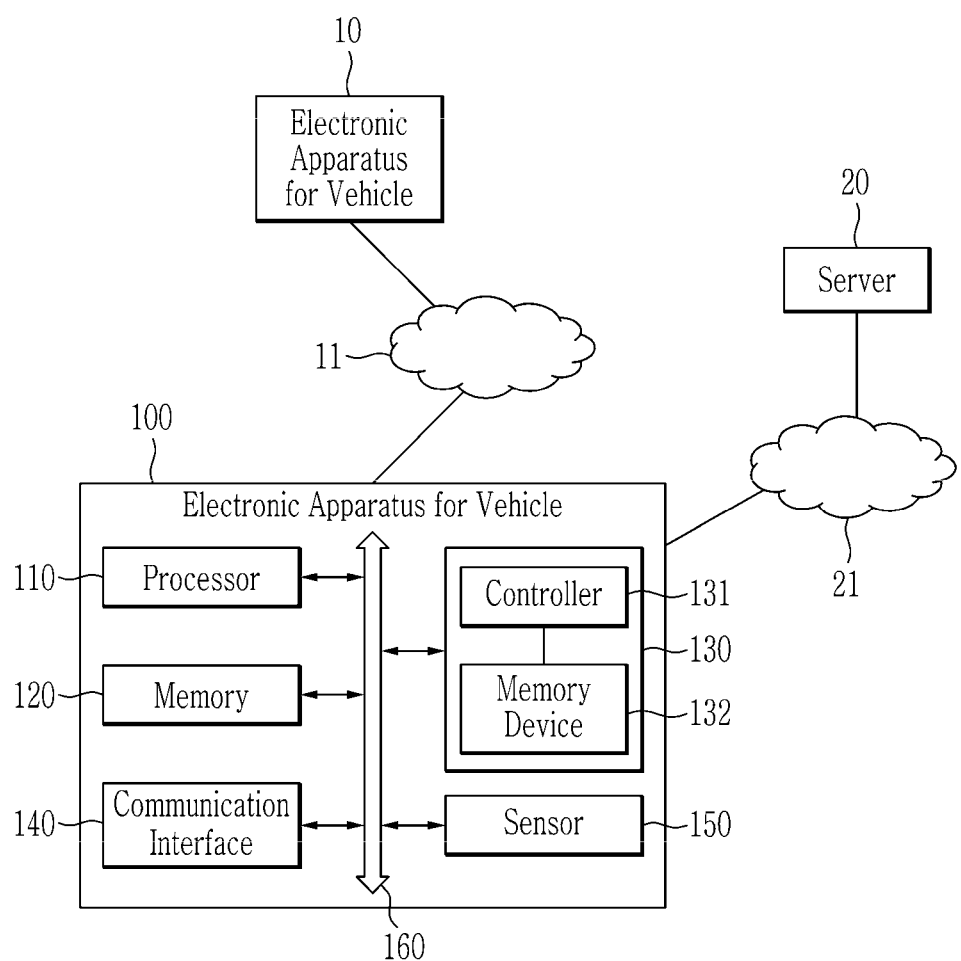
FIG. 1 is an example drawing showing an electronic apparatus for a vehicle according to an embodiment.

In the following detailed description, only certain embodiments of the present invention have been shown and described, simply by way of illustration. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. The sequence of operations or steps is not limited to the order presented in the claims or figures unless specifically indicated otherwise. In some embodiments, order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms "first," "second," and the like may be used herein to describe various elements, components, steps and/or operations, these terms are only used to distinguish one element, component, step or operation from another element, component, step, or operation.

FIG. 1 is an example drawing showing an electronic apparatus for a vehicle according to an embodiment.

Referring to FIG. 1, an electronic apparatus 100 for a vehicle may include a processor 110, a memory 120, a storage device 130, a communication interface 140, a sensor 150, and a bus 160. The electronic apparatus 100 may be mounted in the vehicle.

The electronic apparatus 100 may be connected to an electronic apparatus 10 of another vehicle via a network 11. In some embodiments, the electronic apparatus 100 may be connected to a server 20 via a network 21. The server 20 may be a computing device that manages information collected from the electronic apparatus 100. In some embodiments, the two networks 11 and 21 may be the same network or different networks.

The processor 110 may control an overall operation of one or more components of the electronic apparatus 100. The processor 110 may be implemented as at least one of various processing units such as a central processing unit (CPU), an application processor (AP), a graphic processing unit (GPU), and a microcontroller unit (MCU). The memory 120 may store instructions and data for an operation of the electronic apparatus 100. The processor 110 may execute the instructions stored in the memory 120 to perform a predetermined operation. The processor 110 may collect information related to an accident (accident-related information) of a nearby vehicle through the communication interface 140 or the sensor 150, encrypt the collected information based on (e.g., using) a public key, and store the encrypted information in the storage device 130. In some embodiments, the processor 110 may send the collected information to the server 20 after signing the collected information based on a private key.

The communication interface 140 may be provided to connect (e.g. perform wireless communication) with the nearby vehicle (e.g., an electronic apparatus of the nearby vehicle) 10, the server 20, or a terminal. Vehicles, servers, and/or terminals that are communicatively coupled with one another (e.g., configured to communicate data therebetween, for example, wirelessly) may be referred to herein as "connected to" or "connected with" one another. The communication interface 140 may include a communication module that performs communication according to a wireless communication standard. In some embodiments, the communication interface 140 may include one or more communication modules supporting different wireless communication standards.

In some embodiments, the communication interface 140 may use wireless communication, and may transmit/receive a wireless signal by being connected to the nearby vehicle 10, the server 20, or the terminal on a wireless communication network. The communication interface 140 may use, for example, a wireless communication standard for vehicle communication, such as wireless access for vehicle environment (WAVE), vehicle to everything (V2X), or dedicated short-range communications (DSRC), or a universal wireless communication standard, such as long-term evolution (LTE), 5G, or wireless local area network (WLAN). In some embodiments, the communication interface 140 may be connected to the nearby vehicle 10 through a base station when using the wireless communication. The base station refers to an apparatus for connecting a device to another device or for connecting the device to a mobile communication network, and may be called by other terms such as a nodeB and an access point. In some embodiments, the communication interface 140 may be directly connected to the nearby vehicle 10 without the base station when using the wireless communication.

In some embodiments, the communication interface 140 may use short-range communication. In some embodiments, when the communication interface 140 uses the short-range communication, the communication interface 140 may be connected to a nearby terminal through the short-range communication, and may be connected to the nearby vehicle, another terminal, or the server through the nearby terminal to transmit or receive a wireless signal. The communication interface 140 may use, for example, a wireless communication standard for the short-range communication, such as Bluetooth, BLE (Bluetooth low energy), near field communication (NFC), Zigbee, infrared data association (IrDA) communication, Wi-Fi Direct (WFD), or ultrawideband (UWB).

The storage device 130 may store the accident-related information of the nearby vehicle 10. In some embodiments, the storage device 130 may include a controller 131 and a memory device 132. The controller 131 may control the memory device 132. The memory device 132 may be implemented as a non-volatile memory. The non-volatile memory may be, for example, a flash memory. In this case, the storage device 130 may be a flash-based storage device, for example, a solid-state drive (SSD). As another example, the non-volatile memory may be, for example, a memory such as a phase-change memory, a resistive memory, a magnetoresistive memory, a ferroelectric memory, or a polymer memory. In some embodiments, the storage device 130 may include a non-rewritable memory as the non-volatile memory. The non-rewritable memory may be, for example, various types of read-only memory (ROM).

The sensor 150 may sense and collect various information of the nearby vehicle 10 or surrounding area. In some embodiments, the sensor 150 may include a sensor used to collect images of the nearby vehicle 10, the vehicle 100, and/or the surrounding area, a sensor used to sense a speed of the nearby vehicle 10, and/or a sensor used to sense a distance.

The bus 160 may provide a communication function between the components of the electronic apparatus 100. The bus 160 may include at least one type of bus according to a communication protocol between the components.

Figure 2:
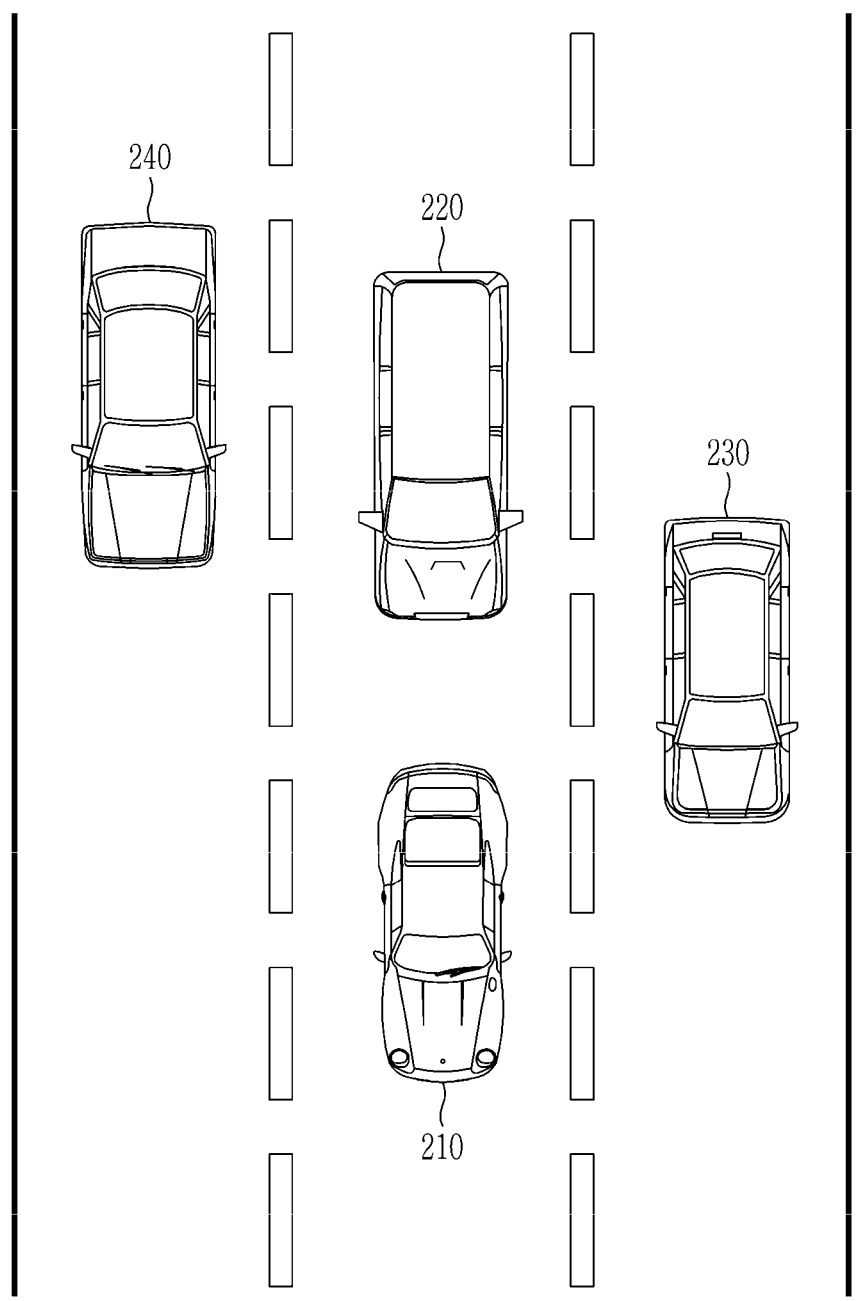
FIG. 2 is an example drawing showing a connection state of vehicle.
Figure 3:
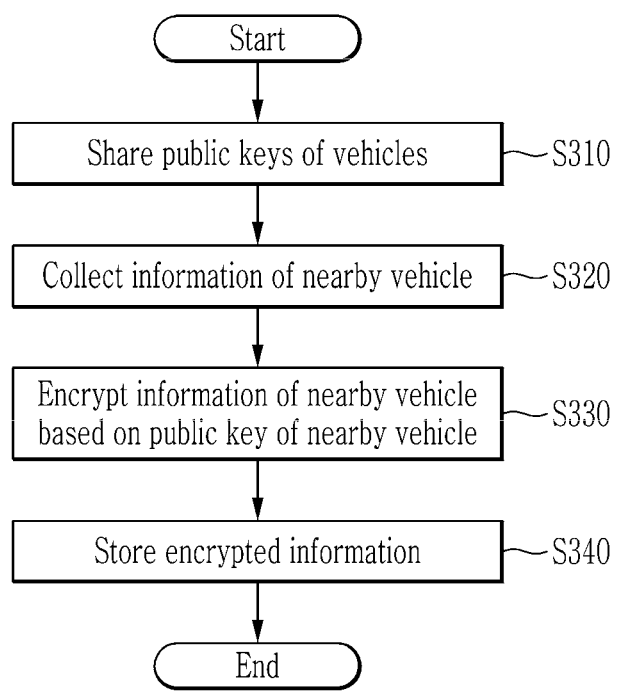
FIG. 3, FIG. 4, FIG. 5, FIG. 6, FIG. 7, and FIG. 8 are example flowcharts of a method of storing vehicle information according to various embodiments.

FIG. 2 is an example drawing showing a connection state of vehicle, and FIG. 3 is an example flowchart of a method of storing vehicle information according to an embodiment.

Referring to FIG. 2, a plurality of vehicles 210, 220, 230, and/or 240 may be connected to each other. Although FIG.

2 shows the four vehicles 210, 220, 230, and 240 for convenience of description, the number of vehicles 210, 220, 230 and 240 is not limited thereto. In some embodiments, the vehicles 210, 220, 230, and 240 may be connected to each other via a base station or directly connected to each other without the base station. In some embodiments, the vehicles 210, 220, 230, and 240 may be connected to each other through a communication interface (e.g., 140 in FIG. 1) of an electronic apparatus for each of the vehicles. In some embodiments, the vehicles 210, 220, 230, and 240 may be connected to each other through a separate communication device (e.g., a terminal) connected to the communication interface 140 of the electronic apparatus for each of the vehicles. When the vehicles 210, 220, 230, and 240 are connected to each other, each of the vehicles 210, 220, 230, and 240 may monitor a nearby vehicle.

Referring to FIG. 2 and FIG. 3, when the vehicles 210, 220, 230, and/or 240 are connected to each other, the vehicles 210, 220, 230, and/or 240 may share a public key of one or more of the vehicles 210, 220, 230, and 240 at S310. For example, a processor (e.g., 110 in FIG. 1) of each of the vehicles 210, 220, 230, and 240 may share the public keys of the vehicles 210, 220, 230, and 240 through a communication interface (e.g., 140 in FIG. 1).

In some embodiments, the vehicles 210, 220, 230, and/or 240 may share the public keys through various methods. The various methods may include, for example, a method in which each vehicle directly transmits its own public key to a nearby vehicle (i.e., without an intervening server or terminal) or a method in which each vehicle transmits its own public key to a server or a terminal and the nearby vehicle receives the public key of another vehicle from the server or terminal, but are not limited thereto.

Each vehicle may have its own public key and a private key corresponding to the public key. The public key and the private key of each vehicle may be, for example, a public key and a private key of the vehicle itself, a public key and a private key of an owner or a driver of the vehicle, or a public key and a private key of a terminal connected to the vehicle, but are not limited thereto. In some embodiments, each vehicle may have a pair of the private key and the public key pair through various methods. The various methods may include, for example, a method in which each vehicle generates a private key and generates a public key based on the private key, a method in which each vehicle receives a private key from a server or a terminal and generates a public key based on the private key, or a method in which each vehicle receives a pair of a private key and a public key from a server or a terminal, but are not limited thereto.

In some embodiments, the private key and the public key may be generated through various methods. The various methods may include, for example, a method of generating a private key and a public key based on an encryption algorithm or a method of generating a private key and a public key based on a blockchain technology, but are not limited thereto.

The vehicle 230 and/or 240 may collect information of the nearby vehicle 210 at S320. Hereinafter, although it is described that the vehicle 230 collects information of the vehicle 210 for convenience of description, a plurality of vehicles 230 and 240 may collect information of the vehicle 210. For example, the processor 110 of the vehicle 230 may collect the information of the vehicle 210 through a communication interface 140 or a sensor (e.g., 150 in FIG. 1). In some embodiments, the vehicle 230 may be a vehicle traveling in the same direction as the vehicle 210 to continuously collect the information of the vehicle 210. In some embodiments, the collected information of the vehicle 210 may include identification information of the vehicle 210 and accident-related information of the vehicle 210. The accident-related information may include, for example, at least one of a speed of the vehicle 210, image information of the vehicle 210 or its surroundings, lane departure information of the vehicle 210, a distance between the vehicle 210 and an adjacent vehicle (e.g., 220), acceleration or deceleration information of the vehicle 210, engine information of the vehicle 210, or a speed of the adjacent vehicle 220, but is not limited thereto.

In some embodiments, the vehicle 230 may collect information of the nearby vehicle 210 from a point in time when a state of the nearby vehicle 210 satisfies a predetermined condition at S320. In some embodiments, the predetermined condition may include a condition in which the vehicle 210 is determined to have a high accident probability. When the accident probability of the vehicle 210 is higher than a threshold, it may be determined that the accident probability of the vehicle 210 is high. In some embodiments, the accident probability of the vehicle 210 may be determined based on measurement information of the vehicle 210. The measurement information may include, for example, at least one of the speed of the vehicle 210, a degree of lane departure of the vehicle 210, a relationship (e.g., distance or speed difference) between the vehicle 210 and the adjacent vehicle 220, but is not limited thereto.

In some embodiments, the vehicle 230 may end collecting the information of the nearby vehicle 210 when the state of the nearby vehicle 210 satisfies an end condition. In some embodiments, the end condition may include a condition in which the accident of the nearby vehicle 210 actually occurs or a condition in which the nearby vehicle does not transmit the information during a predetermined time or more.

The vehicle 230 may encrypt the collected information of the vehicle 210 based on the public key of the vehicle 210 at S330. The vehicle 230 may store the encrypted information of the vehicle 210 in its own storage device (e.g., 130 in FIG. 1) at S340. For example, the processor 110 of the vehicle 230 may encrypt the information of the vehicle 210 and store the encrypted information in the storage device 130. In some embodiments, the vehicle 230 may store the encrypted information of the vehicle 210 in a memory (e.g., 120 in FIG. 1) and transfer an inputs/output (I/O) instruction to a controller (e.g., 131 in FIG. 1) of the storage device 130 so that the controller 131 of the storage device 130 can store the information stored in the memory 120 in a memory device (e.g., 132 of FIG. 1) based on the I/O instruction. In some embodiments, the vehicle 230 may store the information of the vehicle 210 in a storage area where deletion is prohibited within the storage device 130. Accordingly, a possibility that the information of the vehicle 210 will be deleted by overwriting or deletion in the storage device 130 can be prevented. The storage area where the deletion is prohibited may be an over-provision (OP) area or a storage area set by the storage device 130. In some embodiments, the vehicle 230 may store the encrypted information of the vehicle 210 in the memory 120, and store the information stored in the memory 120 in a non-rewritable storage device 130.

According to the above-described embodiments, the information of the vehicle having the high accident probability can be stored in the other vehicle 230. As a result, even if a problem occurs in the storage device of the vehicle 210 due to the accident of the vehicle 210, the information stored in the vehicle 230 can be used to identify a cause of the accident in the vehicle. Further, since the information encrypted with the public key of the vehicle 210 is stored, the vehicle 210 can acquire the information by decrypting the encrypted information with its private key, but other vehicles cannot acquire the information. Further, when the information of the vehicle 210 is stored in the storage device that cannot be rewritten or deleted, the possibility that the information of the vehicle 210 will be deleted by overwriting or deletion of the storage device can be reduced or prevented.

Figure 4:
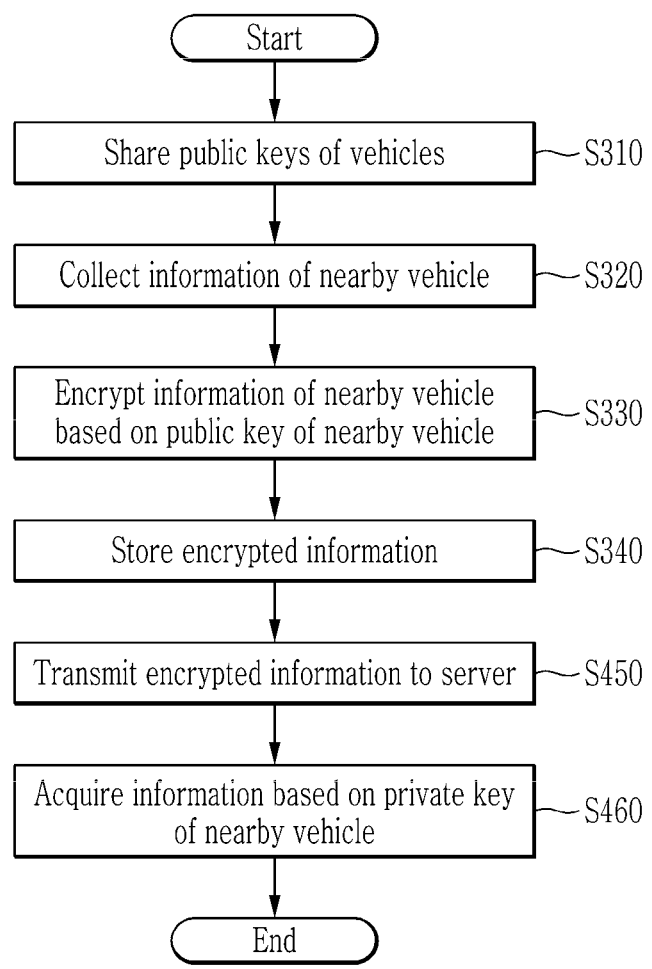

FIG. 4 is an example flowchart of a method of storing vehicle information according to an embodiment.

Referring to FIG. 4, vehicles 230 and/or 210 may perform operations S310 to S340 described with reference to FIG. 3.

Further, the vehicle 230 may transmit information of the vehicle 210 stored in a storage device 130 to an external server at S450. In some embodiments, the vehicle 230 may delete the information of the vehicle 210 stored in its storage device 130 after transmitting the information of the vehicle 210 to the external server.

In some embodiments, the vehicle 210 may acquire the information of the vehicle 210 by decrypting the information of the vehicle 210 uploaded to the external server based on a private key of the vehicle 210 at S460.

In some embodiments, the vehicle 230 may provide the information of the vehicle 210 to the vehicle 210 or a person related to the vehicle 210 without transmitting the information to the external server. In some embodiments, the information stored in the storage device 130 of the vehicle 230 may be provided to the vehicle 210 or the person associated with the vehicle 210 through a physical medium or short-range communication.

Figure 5:
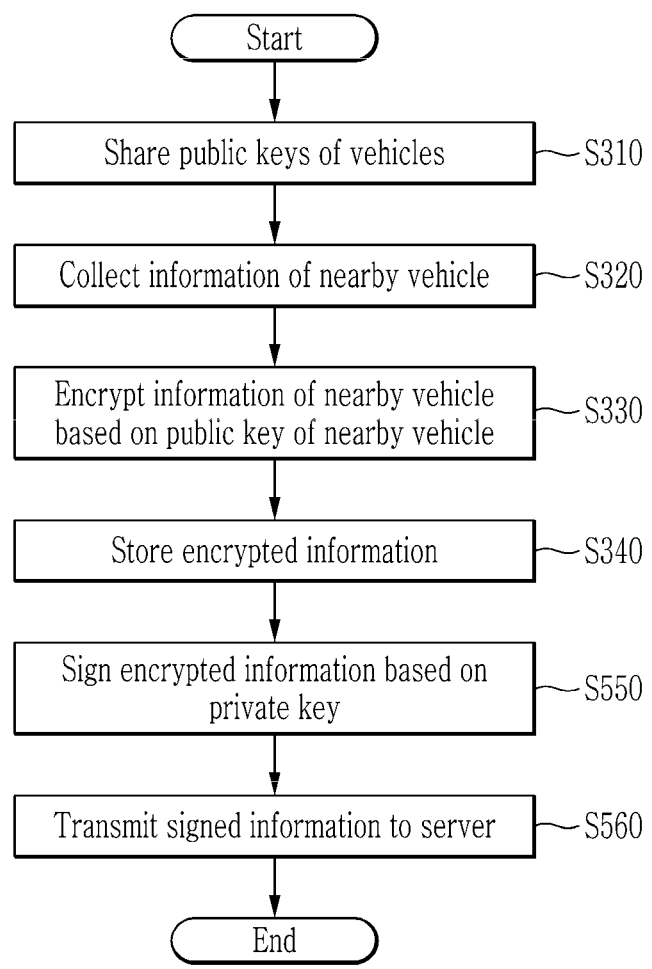

FIG. 5 is an example flowchart of a method of storing vehicle information according to an embodiment.

Referring to FIG. 5, vehicles 230 and/or 210 may perform operations S310 to S340 described with reference to FIG. 3.

Further, the vehicle 230 may sign information of the vehicle 210 stored in its storage device 130 based on a private key of the vehicle 230 at S550. For example, the vehicle 230 may generate a signature by encrypting a hash value of the stored information based on the private key. The vehicle 230 may transmit the signed information (or the information appended with the signature) to an external server at S560. In some embodiments, when the vehicle 230 and the external server are nodes constituting the blockchain, the vehicle 230 may transmit the information of the vehicle 210 signed based on the private key to the external server in a blockchain environment at S560.

The server may verify whether the vehicle 230 has transmitted the information of the vehicle 210 and whether the transmitted information of the vehicle 230 has not been modified, based on the public key of the vehicle 230. For example, identity verification may be performed while ensuring anonymity in the blockchain environment.

Figure 6:
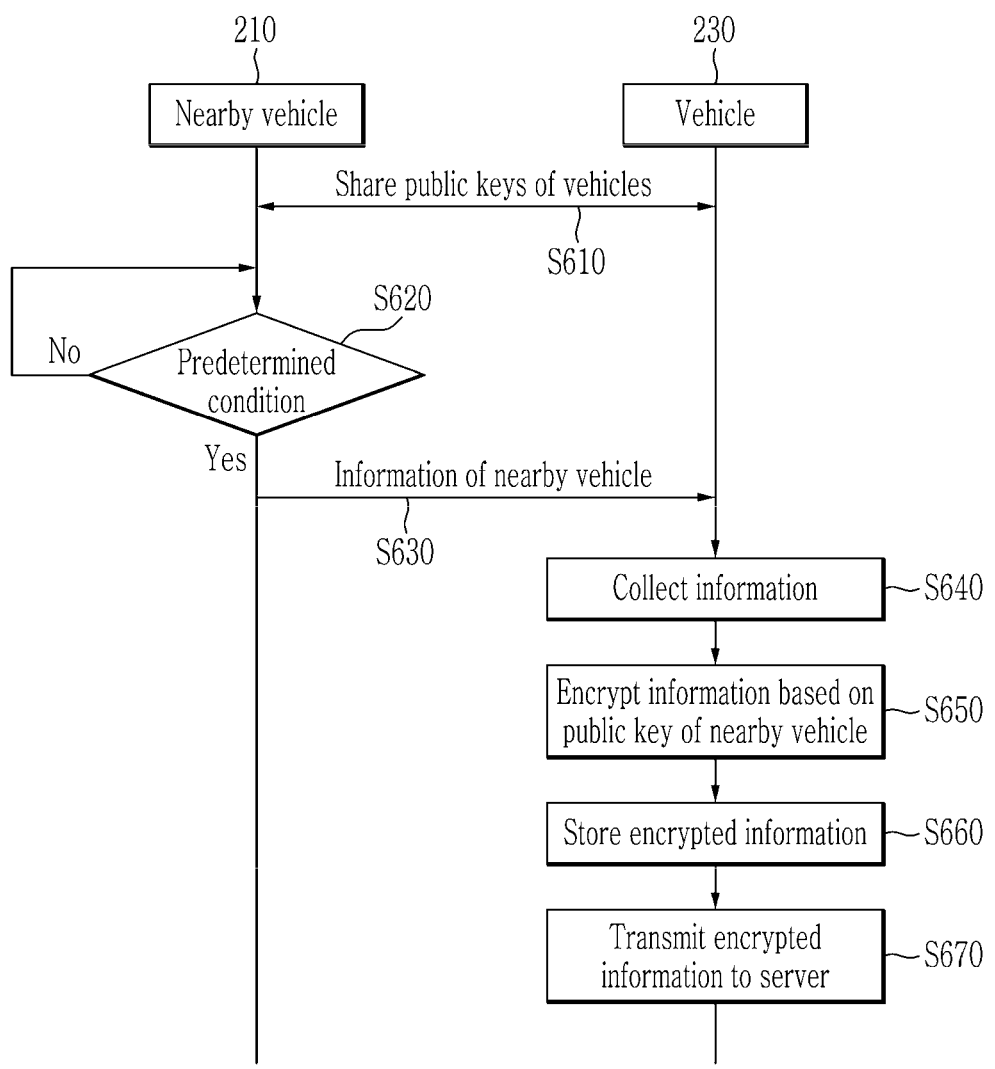

FIG. 6 is an example flowchart illustrating a method of storing vehicle information according to an embodiment.

Referring to FIG. 2 and FIG. 6, when a plurality of vehicles 210, 220, 230, and/or 240 are connected to each other, the vehicles 210, 220, 230, and/or 240 may share a public key of one or more of the vehicles 210, 220, 230, and 240 at S610. The vehicle 210 may determine whether a state of the vehicle 210 satisfies a predetermined condition at S620. For example, a processor (e.g., 110 of FIG. 1) of the vehicle 210 may determine whether the state of the vehicle satisfies the predetermined condition.

When the state of the vehicle 210 satisfies the predetermined condition, the vehicle 210 may collect information of the vehicle 210 itself and transmit the collected information to the other vehicle (e.g., 230) at S630. For example, the processor 110 of the vehicle 210 may transmit information of the vehicle 210 to the vehicle 230 through a communication interface (e.g., 140 in FIG. 1). In some embodiments, the collected information of the vehicle 210 may include information related to an accident. In some embodiments, the vehicle 210 may collect the information in real-time and transmit the collected information to the vehicle 230 at S630. In some embodiments, the vehicle 210 may periodically collect the information and transmit the collected information to the vehicle 230 at S630.

The vehicle 230 may receive the information of the vehicle 210 transmitted from the vehicle 210 and collect the information of the vehicle 210 at S640. The vehicle 230 may encrypt the collected information of the vehicle 210 based on the public key of the vehicle 210 at S650. The vehicle 230 may store the encrypted information of the vehicle 210 in its own storage device (e.g., 130 in FIG. 1) at S660. In some embodiments, the vehicle 230 may transmit the information of the vehicle 210 stored in the storage device 130 to an external server at S670.

In this way, the vehicle 210 can provide the information collected by the vehicle 210 itself to the other vehicle 230, and the other vehicle 230 may encrypt the information of the vehicle 210 with the public key of the vehicle 210 and store the encrypted information.

Figure 7:
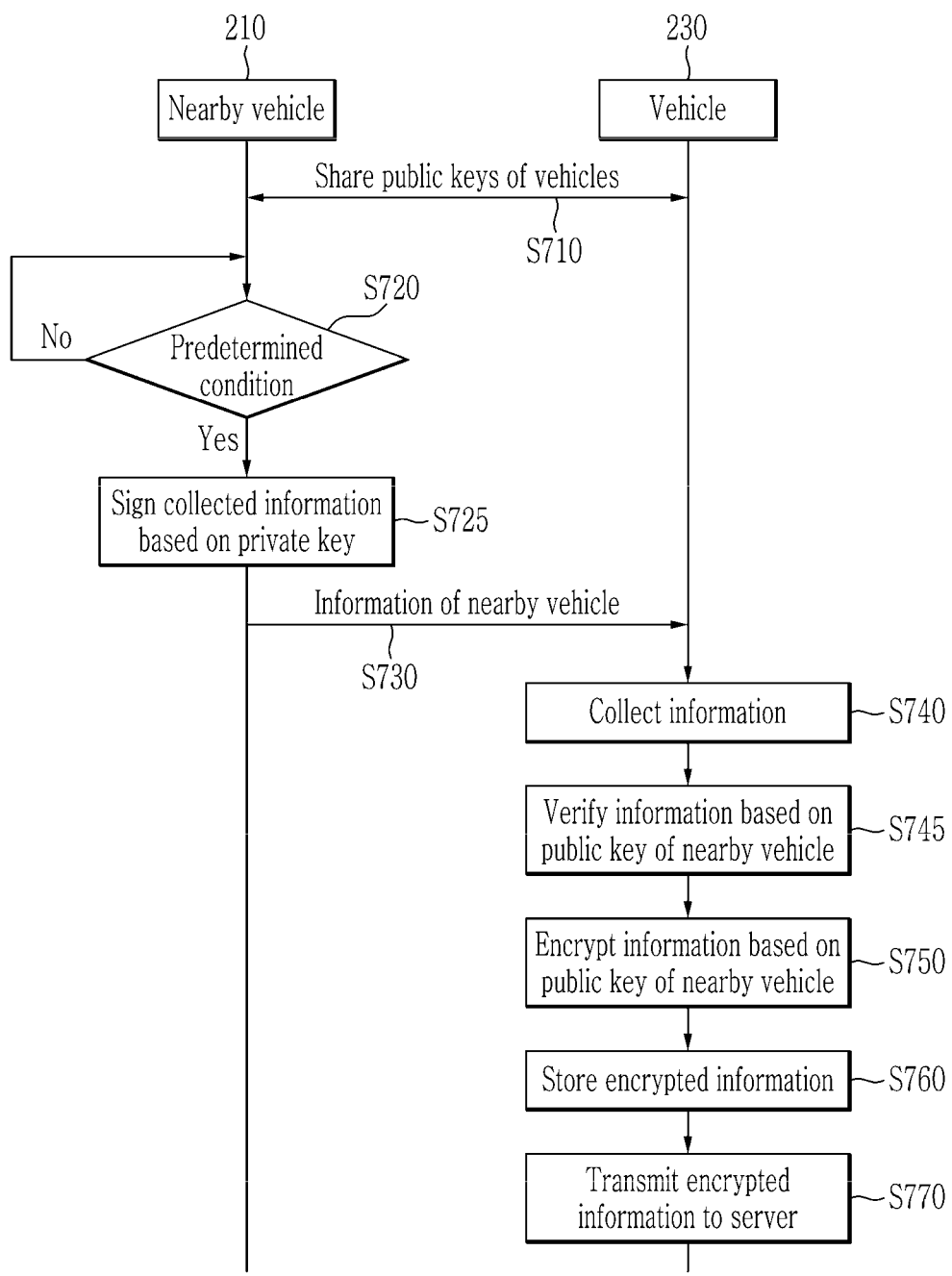

FIG. 7 is an example flowchart of a method of storing vehicle according to an embodiment.

Referring to FIG. 2 and FIG. 7, when a plurality of vehicles 210, 220, 230, and/or 240 are connected to each other, the vehicles 210, 220, 230, and/or 240 may share a public key of one or more of the vehicles 210, 220, 230, and 240 S710. The vehicle 210 may determine whether a state of the vehicle 210 satisfies a predetermined condition at S720.

When the state of the vehicle 210 satisfies the predetermined condition, the vehicle 210 may collect information of the vehicle 210 itself and sign the collected information based on the private key of the vehicle 210 at S725. For example, the vehicle 210 may generate a signature by encrypting a hash value of the collected information based on the private key. The vehicle 210 may transmit the signed information (or the collected information appended with the signature) to the other vehicle 230 at S730.

The vehicle 230 may collect the information of the vehicle 210 by receiving the information of the vehicle 210 transmitted from the vehicle 210 at S740. The vehicle 230 may verify the signature appended to the information of the vehicle 210 based on the public key of the vehicle 210 at S745. If the verification is successful, the vehicle 230 may encrypt the collected information of the vehicle 210 based on the public key of the vehicle 210 at S750. The vehicle 230 may store the encrypted information of the vehicle 210 in its own storage device (e.g., 130 in FIG. 1) at S760. In some embodiments, the vehicle 230 may transmit the information of the vehicle 210 stored in the storage device 130 to an external server at S770.

In this way, the vehicle 230 can verify whether the vehicle 210 has transmitted the information of the vehicle 210 and whether the transmitted information of the vehicle 210 has not been modified, based on the public key of the vehicle 210.

Figure 8:
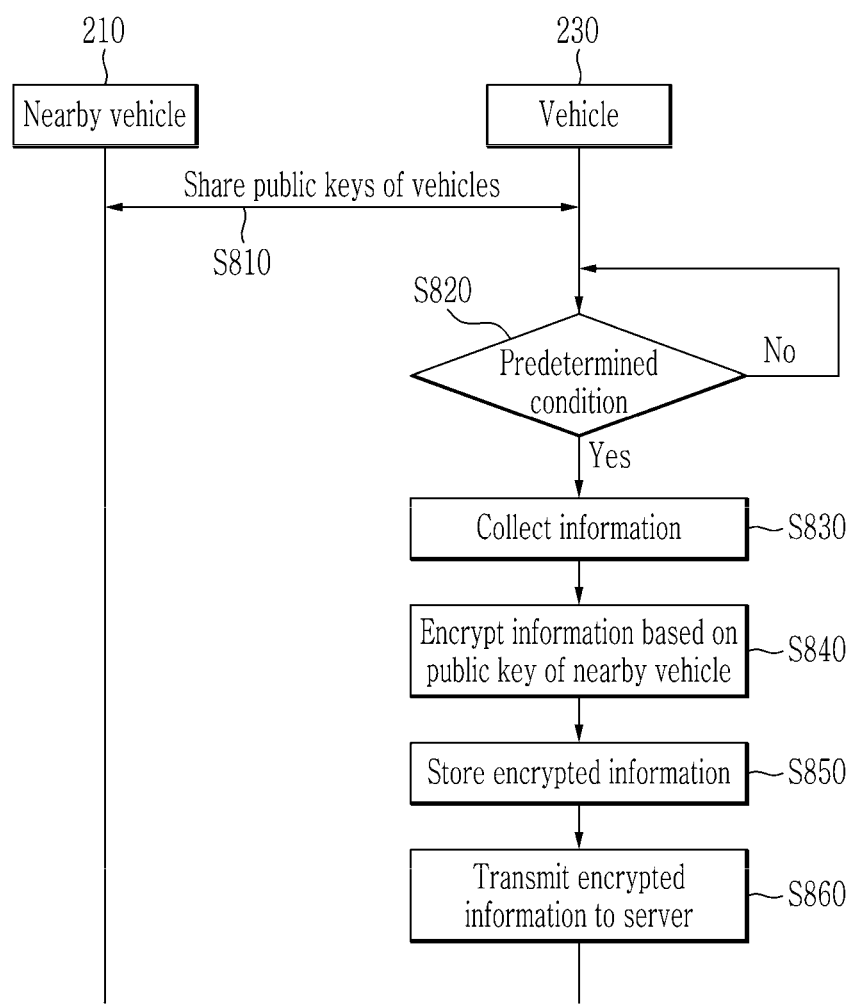

FIG. 8 is an example flowchart of a method of storing vehicle information according to an embodiment.

Referring to FIG. 2 and FIG. 8, when a plurality of vehicles 210, 220, 230, and/or 240 are connected to each other, the vehicles 210, 220, 230, and/or 240 may share a public key of one or more of the vehicles 210, 220, 230, and 240 at S810. The vehicle 230 may determine whether a state of the nearby vehicle (e.g., 210) satisfies a predetermined condition at S820. For example, a processor (e.g., 110 of FIG. 1) of the vehicle 230 may determine whether the state of the nearby vehicle 210 satisfies the predetermined condition. In some embodiments, the vehicle 230 may determine whether the state of the nearby vehicle 210 satisfies the predetermined condition based on information of the nearby vehicle 210 collected through a sensor (e.g., 150 in FIG. 1). For example, the vehicle 230 may collect, through the sensor 150, at least one of a speed of the vehicle 210, a degree of lane departure of the vehicle 210, a relationship (e.g., distance or speed difference) between the vehicle 210 and the adjacent vehicle (e.g., 220), and determine whether the state of the nearby vehicle 210 satisfies the predetermined condition based on the collected information.

When the state of the nearby vehicle 210 satisfies the predetermined condition, the vehicle 230 may continue to collect the information of the vehicle 210 through the sensor 150 at S830. In some embodiments, the collected information of the vehicle 210 may include information related to an accident. In some embodiments, vehicle 230 may collect the information of vehicle 210 in real-time at S830. In some embodiments, vehicle 230 may periodically collect the information of vehicle 210 at S830. In some embodiments, the vehicle 230 may receive from the vehicle 210 information of the vehicle 210 that cannot be collected through the sensor 150. The information of the vehicle 210 that cannot be collected through the sensor 150 may include, for example, engine information of the vehicle 210.

The vehicle 230 may encrypt the collected information of the vehicle 210 based on the public key of the vehicle 210 at S840. The vehicle 230 may store the encrypted information of the vehicle 210 in its own storage device (e.g., 130 in FIG. 1) at S850. In some embodiments, the vehicle 230 may transmit the information of the vehicle 210 stored in the storage device 130 to an external server at S860.

In this way, since the information of the vehicle 210 can be collected by the other vehicle 230, even if the information is not provided from the vehicle 210, the other vehicle 230 can encrypt the information of the vehicle 210 based on the public key of the vehicle 210 and store the encrypted information.

In some embodiments, the method of storing vehicle information described above may be implemented as computer-readable program code or a computer program stored on a non-transitory computer-readable medium. In some embodiments, the computer-readable medium may be a removable recording medium or a fixed recording medium. In some embodiments, the computer program recorded on the computer-readable medium may be transmitted to another computing device via a network such as the Internet and installed in another computing device, so that the computer program can be executed by another computing device.

In some embodiments, to implement the method of storing vehicle information described above, the computer program may include one or more instructions of collecting information of a nearby vehicle connected to a vehicle, encrypting the information of the nearby vehicle based on a public key of the nearby vehicle to generate encrypted information, and storing the encrypted information in a storage device of an electronic apparatus.

In some embodiments, to implement the method of storing vehicle information described above, the computer program may include one or more computer-readable instructions of transmitting information of a vehicle to an outside or external device, and acquiring the information of the vehicle based on a private key of the vehicle from a server to which the information of the vehicle that is encrypted based on a public key of the vehicle by the nearby vehicle is uploaded.

While this invention has been described in connection with particular embodiments, it is to be understood that the invention is not limited to the disclosed embodiments. On the contrary, it is intended to cover various modifications and equivalent arrangements included within the scope of the appended claims.

What is claimed is:

1. An electronic apparatus configured to be mounted on a first vehicle, the electronic apparatus comprising:
 a storage device comprising a non-volatile memory;
 a memory configured to store one or more computer-readable instructions; and
 at least one processor configured to, by executing the one or more computer-readable instructions:
  collect, by the electronic apparatus, information of a second vehicle connected to the first vehicle;
  encrypt, by the electronic apparatus, the information of the second vehicle using a public key of the second vehicle to generate encrypted information of the second vehicle; and
  store, by the electronic apparatus, the encrypted information of the second vehicle in the non-volatile memory of the storage device of the electronic apparatus that is configured to be mounted on the first vehicle.

2. The electronic apparatus of claim 1, wherein the processor is configured to share the public key of the second vehicle when the first vehicle is connected with the second vehicle.

3. The electronic apparatus of claim 1, wherein the processor is configured to transmit the encrypted information to a server.

4. The electronic apparatus of claim 3, wherein the processor is configured to delete the encrypted information of the second vehicle from the storage device after transmitting the encrypted information to the server.

5. The electronic apparatus of claim 3, wherein the processor is configured to:
 sign the encrypted information of the second vehicle using based on a private key of the first vehicle to generate a signature; and
 transmit the encrypted information of the second vehicle appended with the signature based on the private key of the first vehicle to the server.

6. The electronic apparatus of claim 1, wherein the non-volatile memory comprises a non-rewritable memory.

7. The electronic apparatus of claim 1, wherein the processor is configured to store the encrypted information of the second vehicle in an area where deletion is prohibited within the storage device.

8. The electronic apparatus of claim 1, further comprising:
 a communication interface configured to communicate with the second vehicle,
 wherein the processor is configured to receive the information of the second vehicle from the second vehicle through the communication interface.

9. The electronic apparatus of claim 8, wherein the processor is configured to receive the information of the second vehicle from the second vehicle through the communication interface when an accident probability of the second vehicle exceeds a threshold.

10. The electronic apparatus of claim 8, wherein the information of the second vehicle is signed based on a private key of the second vehicle, and the processor is configured to verify a signature based on the public key of the second vehicle.

11. The electronic apparatus of claim 1, further comprising:
  a sensor configured to sense the second vehicle,
  wherein the processor is configured to collect the information of the second vehicle from the sensor.

12. The electronic apparatus of claim 11, wherein the processor is configured to collect the information of the second vehicle from the sensor when an accident probability of the second vehicle exceeds a threshold.

13. The electronic apparatus of claim 1, wherein the information of the second vehicle comprises identification information of the second vehicle and information related to an accident of the second vehicle.

14. An electronic apparatus configured to be mounted on a first vehicle, the electronic apparatus comprising:
  a memory configured to store one or more computer-readable instructions; and
  a processor configured to, by executing the one or more computer-readable instructions, perform operations comprising:
    transmitting information of the first vehicle to an external device; and
    acquiring the information of the first vehicle from a server that received the information of the first vehicle from a second vehicle, wherein the information of the first vehicle that was acquired from the server is encrypted and stored in a non-volatile memory of an electronic device associated with the second vehicle based on a public key of the first vehicle,
    wherein acquiring comprises decrypting the information of the first vehicle that was acquired from the server using a private key of the first vehicle.

15. The electronic apparatus of claim 14, wherein the processor is configured to share the public key of the first vehicle with the second vehicle when the first vehicle is connected with the second vehicle.

16. A method performed by an electronic apparatus of a first vehicle, the method comprising:
  executing, by at least one processor of the electronic apparatus of the first vehicle, computer-readable instructions to perform operations comprising:
    collecting, by the electronic apparatus of the first vehicle, information of a second vehicle connected to the first vehicle;
    encrypting, by the electronic apparatus of the first vehicle, the information of the second vehicle using a public key of the second vehicle to generate encrypted information of the second vehicle; and
    storing, by the electronic apparatus of the first vehicle, the encrypted information of the second vehicle in a non-volatile memory of a storage device of the electronic apparatus of the first vehicle.

17. The method of claim 16, further comprising:
sharing the public key of the second vehicle when the first vehicle is connected with the second vehicle.

18. The method of claim 16, further comprising:
signing the encrypted information of the second vehicle based on a private key of the first vehicle to generate a signature; and
transmitting the encrypted information of the second vehicle appended with the signature based on the private key of the first vehicle to a server.

19. The method of claim 16, further comprising:
deleting the encrypted information of the second vehicle from the storage device after transmitting the encrypted information to a server.

20. The method of claim 16, wherein the storing the encrypted information comprises storing the encrypted information of the second vehicle in an area where deletion is prohibited within the storage device of the electronic apparatus of the first vehicle.

* * * * *